April 10, 1928. 1,665,213

L. E. LENTZ

CUTTING MACHINE

Filed April 30, 1923   2 Sheets-Sheet 1

Inventor,
Lawrence E. Lentz.
By
Attorney

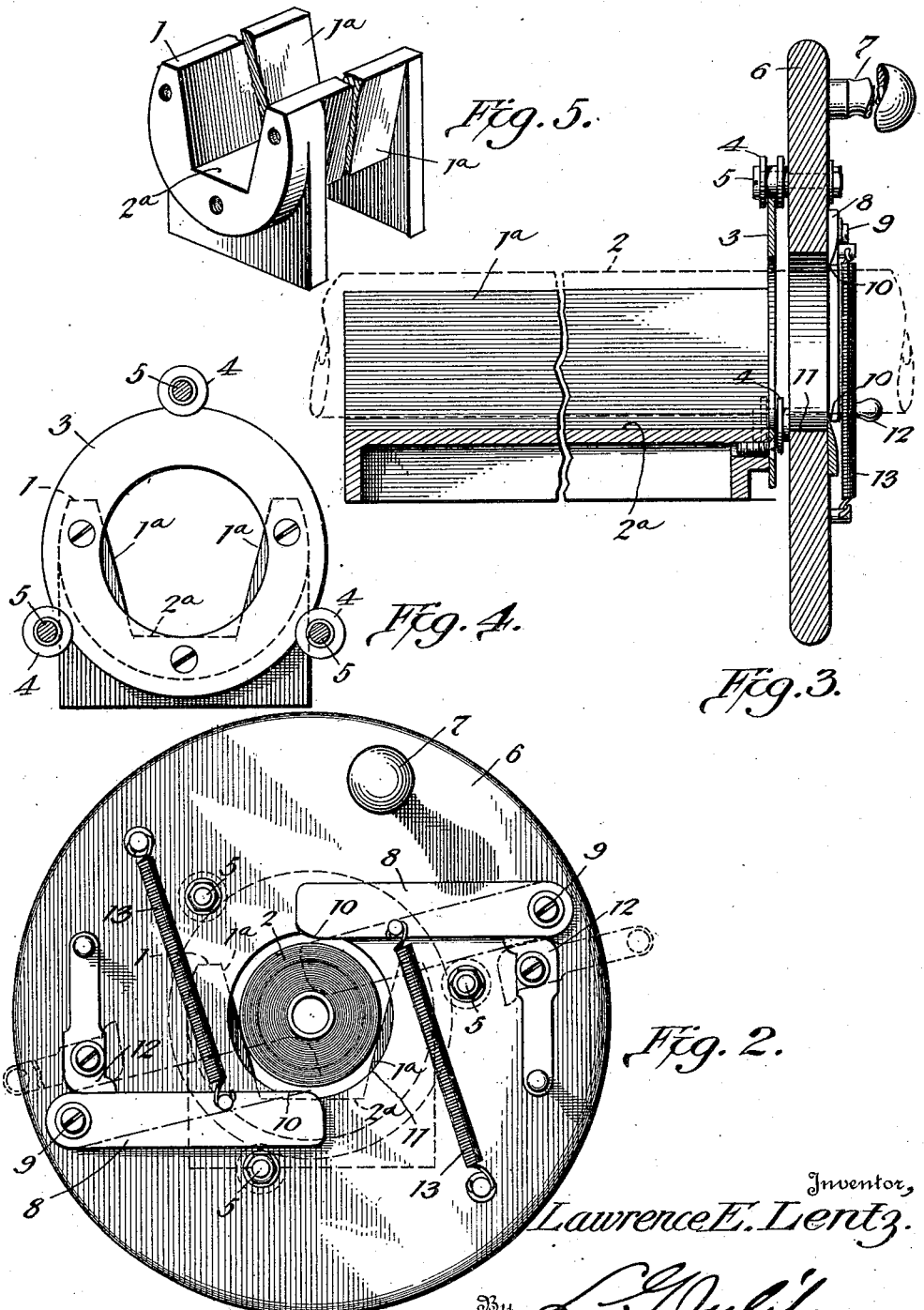

Patented Apr. 10, 1928.

1,665,213

UNITED STATES PATENT OFFICE.

LAWRENCE EDWARD LENTZ, OF HARRISBURG, PENNSYLVANIA, ASSIGNOR TO ELLIOTT-FISHER COMPANY, A CORPORATION OF DELAWARE.

CUTTING MACHINE.

Application filed April 30, 1923. Serial No. 635,662.

This invention relates to cutters, and more particularly, to a roll cutter especially designed for cutting paper or other rolls.

The object of the invention is to produce a simple, inexpensive and effective cutting machine which may be operated by hand to quickly and cleanly sever a roll, as, for instance, a roll of carbon or other paper.

A subordinate object is to produce a machine of this character in which the cutting elements may be quickly and easily detached for sharpening or replacement, readily retained in inactive positions during the replacement or adjustment of the paper roll or other work element, and instantly released for operation when the roll has been placed in position for cutting.

Other and subordinate objects will hereinafter appear.

In the drawings:

Fig. 2 is an end elevation thereof with the cutting blades in inoperative position but showing in dotted lines the operative position of the blades and the released positions of the blade retaining cams.

Fig. 3 is a longitudinal section through the machine with the paper roll indicated in dotted lines.

Fig. 4 is an end elevation of the machine with the cutting head removed, and

Fig. 5 is a perspective view partly broken away of the work holder or roll trough.

Figure 1:
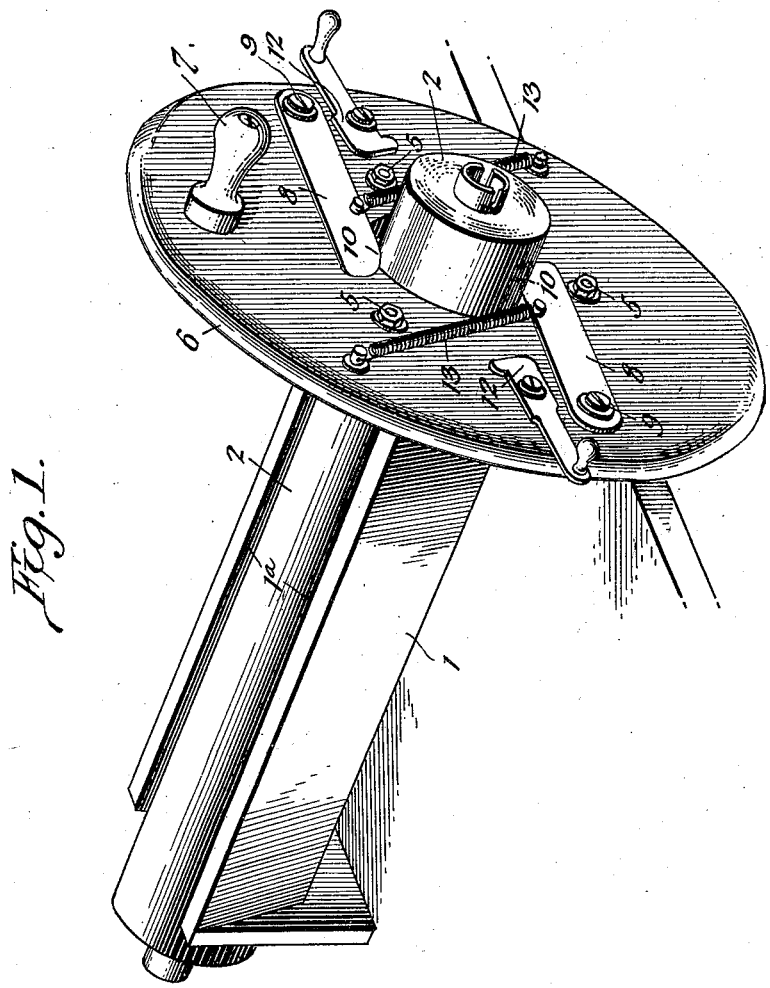
Fig. 1 is a perspective view of my cutting machine.

In the drawings, 1 indicates a work holder in the form of a trough of any suitable material, preferably metal, adapted to receive a work element 2, as for instance, a roll of carbon paper or the like, which it is desired to cut into lengths or to trim to predetermined dimensions. The side walls 1ª of the trough converge toward the bottom 2ª so that the roll when placed in the trough will be wedged between the walls thereof and securely held against rotation by slight pressure thereon during the cutting operation.

Screwed or otherwise secured to the end of the holder 1 is a circular head support or track 3 upon the periphery of which travel the flanged supporting rollers 4 mounted on stud journals 5 spaced equidistantly on a cutting head 6. The head 6 is in the form of a circular plate designed to be rotated in any suitable manner upon the track 3, as, for instance, manually through the application of force to a handle 7 projecting from the front side of the cutting head. Also mounted on the front side of the head 6 are the cutting tools in the form of a pair of cutting blades 8 pivoted at their outer ends 9 adjacent to the periphery of the head and having their front ends provided with cutting edges 10. These cutting edges 10, as clearly shown in Figure 2, are formed by grinding away the inner adjacent corner of the blades 8, which results in cutting edges disposed at an angle to the blades. This serves to maintain an effective relation between the roll and the cutting edges as the blades swing toward the axis of the carbon roll during the cutting operation. The pivots 9 of the blades 8 are located diametrically opposite each other with respect to the axis of the head and the blades normally occupy substantially parallel planes tangential to the inner periphery 11 of the head. This presents the free ends of the blades in such relative positions that the roll 2 held by the trough 1 may extend through the track 3 and head 6 and between the cutting edges 10 of the blades. The blades are held in the normal position described by retaining devices in the form of pivoted cams 12.

When unopposed by the cams 12 the free ends of the blades are urged inwardly toward the axis of the head by springs 13 secured at their opposite ends to the head and blades respectively, as clearly shown in Fig. 2.

It will now appear that in operation the roll 2 is merely placed in the trough and extended through the head 6 with the cutting edges of the blades in the plane of the desired cut. The cams 12 are then swung to release the blades and to allow the springs 13 to draw the cutting edges 10 against the surface of the paper roll or other work element and to automatically feed the blades with just the necessary force to effect the smooth cutting of the roll at diametrically opposite points as the head 6 is rotated.

It will, of course, the understood that in the broader aspects of the invention it is immaterial how the relative motion of the roll and cutters is secured, as an obvious variation of the invention would be to hold the head stationary and rotate the roll either with or without rotating the holder. It will also be apparent that while this cutting machine has been described as a roll cutter and has been particularly designed for the cutting of carbon or other paper rolls it would be equally efficient for the cutting of various other work elements and is in no way to be understood as being limited to the specified use.

In other words, while it is believed that the construction, operation and advantages of the described structure will be clearly apparent, I desire to expressly reserve the right to effect such changes, modifications or variations as may come fairly within the scope of the protection prayed.

What I claim is:

1. A cutting machine including a work holding trough, a circular track secured at one end thereof, and a cutting head having a central opening and provided at one side with flanged guide rollers engaging the circular track and, at the opposite side, with spring urged cutting blades pivoted at their outer ends and having their inner ends located in diametrical opposition to the center of the head and formed with terminal cutting edges disposed at an angle with respect to the blades.

2. A cutting machine including a work holding trough, a circular track at one end thereof, a centrally apertured cutting head having flanged rollers engaging the track at the inner side of the head, a pair of cutting blades hinged at their outer ends on the outer face of the head and having terminal angular cutting faces at diametrically opposite sides of the axis of the head, spiral springs attached to the blades and heads to draw the blades toward the axis of the head and disposed in substantially right angle relation to the blades in one position of the blades and pivoted cams for holding the blades against the resistance of the springs.

3. A cutting machine including a centrally apertured rotary cutting head, a pair of cutting blades pivoted at their outer ends thereon and having cutting edges at their inner adjacent corners located diametrically opposite the axis of the head, spiral springs each attached at its opposite ends to the head and to a blade at a point nearer the cutting end thereof and in position to present the spring substantially at right angles to the blade in one position of the blade, and a pair of pivoted devices carried by the head to urge the blades in opposition to the springs and to retain them when not in action.

In testimony whereof I hereunto affix my signature.

LAWRENCE EDWARD LENTZ.